5 Sheets—Sheet 1.
G. W. McGRAW, Dec'd.
Assignor to J. A. & H. L. McGraw, G. W. McGraw, Jr., & C. E. McGraw.
MACHINE FOR THE MANUFACTURE OF ROOFING.
No. 11,017. Reissued July 30, 1889.
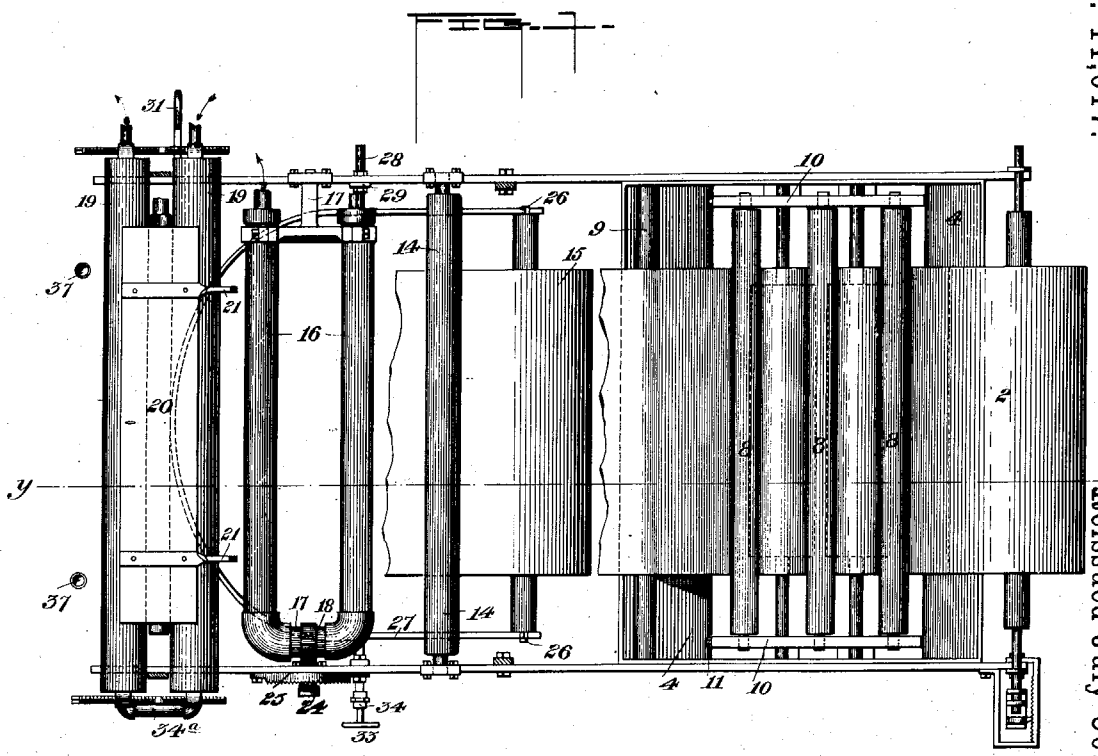
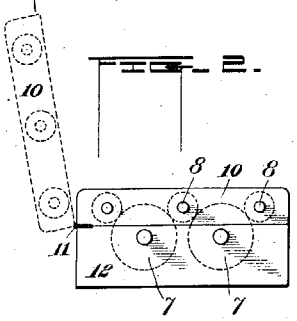
WITNESSES:
W. B. Connin
H. L. Gill
George W. McGraw, deceased
INVENTOR,
John A. McGraw
George W. McGraw Jr.
Henry S. McGraw
Charles E. McGraw assignees
by W. Bakewell & Son Att'ys.

5 Sheets—Sheet 2.
G. W. McGRAW, Dec'd.
Assignor to J. A. & H. L. McGraw, G. W. McGraw, Jr., & C. E. McGraw.
MACHINE FOR THE MANUFACTURE OF ROOFING.
No. 11,017. Reissued July 30, 1889.
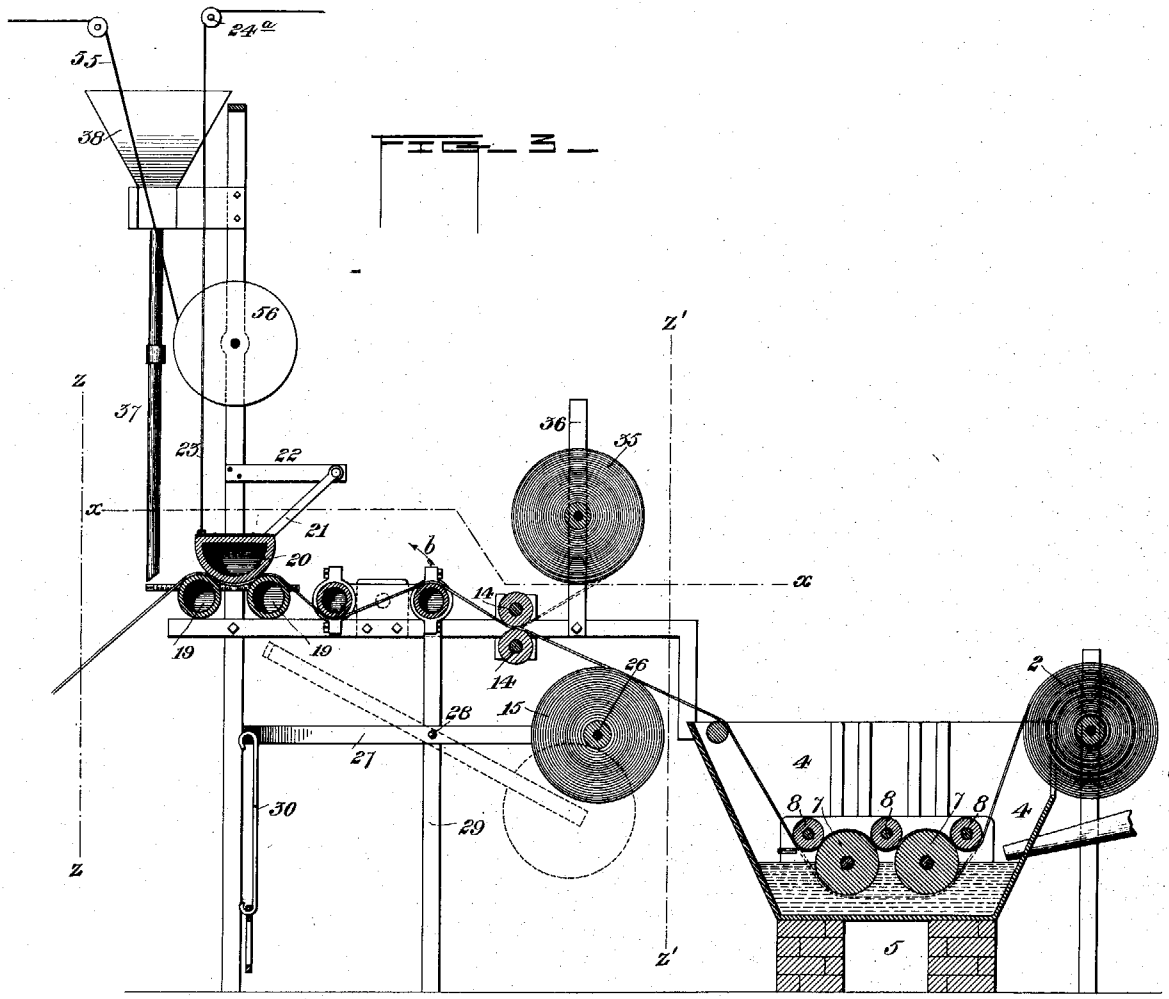
WITNESSES:
N. B. Conrin
N. L. Gill
George W. McGraw deceased
INVENTOR,
John A. McGraw
Geo. W. McGraw Jr.
Henry L. McGraw
Charles E. McGraw
assignees
by W. Baxewell & Sons
Att'ys.

5 Sheets—Sheet 3.
G. W. McGRAW, Dec'd.
Assignor to J. A. & H. L. McGraw, G. W. McGraw, Jr., & C. E. McGraw.
MACHINE FOR THE MANUFACTURE OF ROOFING.
No. 11,017. Reissued July 30, 1889.
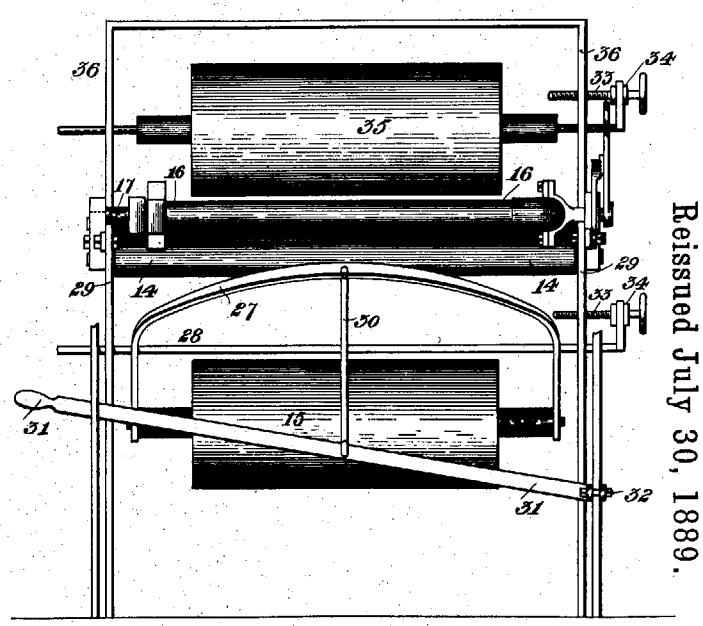
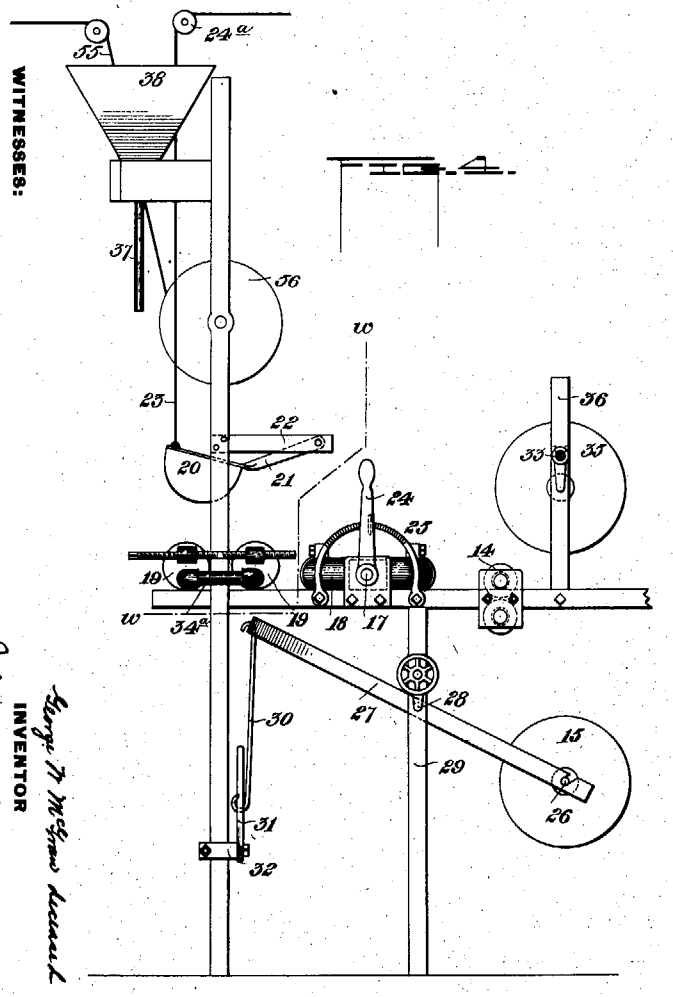
WITNESSES:
W. B. Corwin
H. L. Gill
George W. McGraw deceased
INVENTOR
John A. McGraw
George W. McGraw Jr.
Henry S. McGraw
Chas. E. McGraw
assignees
by W. Baxewell & Sons, their Att'ys.

5 Sheets—Sheet 4.
G. W. McGRAW, Dec'd.
Assignor to J. A. & H. L. McGraw, G. W. McGraw, Jr., & C. E. McGraw.
MACHINE FOR THE MANUFACTURE OF ROOFING.
No. 11,017 Reissued July 30, 1889.
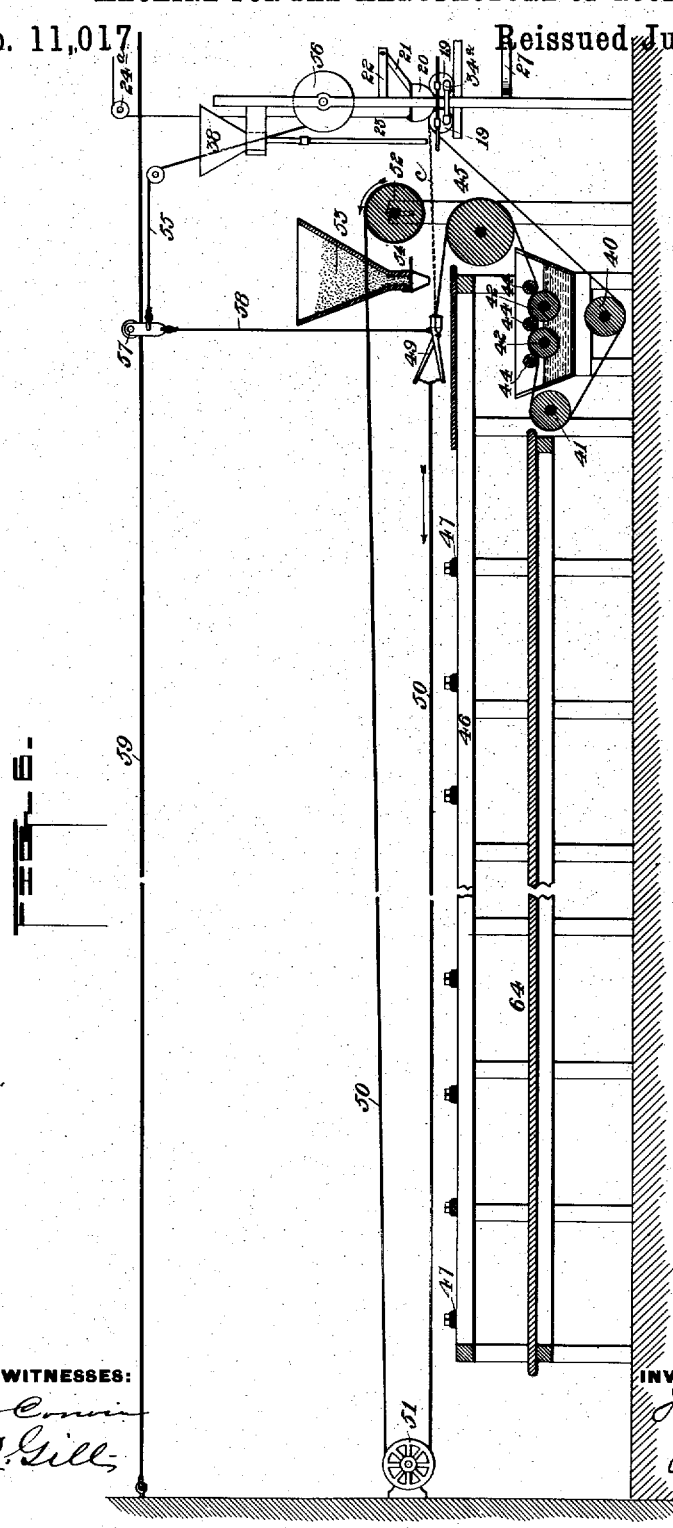
WITNESSES:
N. B. Conwin
H. L. Gill
INVENTOR,
George W. McGraw. deceased
John A. McGraw
George W. McGraw Jr.
Henry L. McGraw
Chas. E. McGraw assignees
by W. Baxewell & Son Att'ys.

5 Sheets—Sheet 5.

G. W. McGRAW, Dec'd.

Assignor to J. A. & H. L. McGraw, G. W. McGraw, Jr., & C. E. McGraw.

MACHINE FOR THE MANUFACTURE OF ROOFING.

No. 11,017. Reissued July 30, 1889.

WITNESSES:

M. B. Cowin

H. L. Gill

George W. McGraw deceased

INVENTOR,

John A. McGraw

George W. McGraw Jr.

Henry L. McGraw

Charles E. McGraw assignees by W. Baxewell & Sons Att'ys.

UNITED STATES PATENT OFFICE.

JOHN A. McGRAW, HENRY L. McGRAW, GEORGE W. McGRAW, JR., AND CHARLES EDWIN McGRAW, OF ALLEGHENY, PENNSYLVANIA, ASSIGNEES OF GEORGE W. McGRAW, DECEASED.

MACHINE FOR THE MANUFACTURE OF ROOFING.

SPECIFICATION forming part of Reissued Letters Patent No. 11,017, dated July 30, 1889.

Original No. 366,857, dated July 19, 1887. Application for reissue filed June 5, 1889. Serial No. 313,239.

*To all whom it may concern*

Be it known that GEORGE W. McGRAW, late of Allegheny city, in the county of Allegheny and State of Pennsylvania, and now deceased, did invent a new and useful Improvement in Machines for the Manufacture of Roofing, of which the following is a full, clear, and exact description, reference being had to the accompanying drawings, forming part of this specification, in which—

Figure 7:
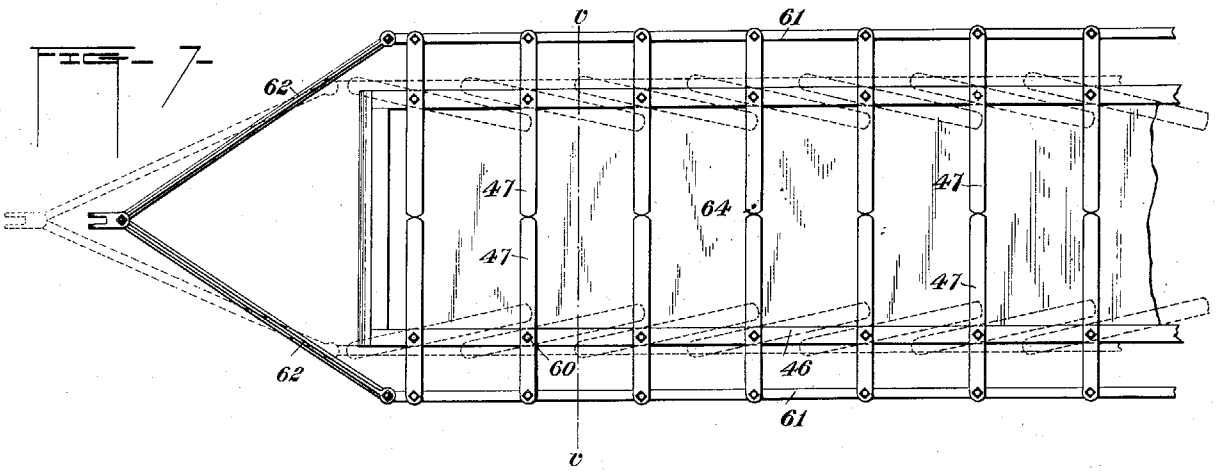
Figure 5:
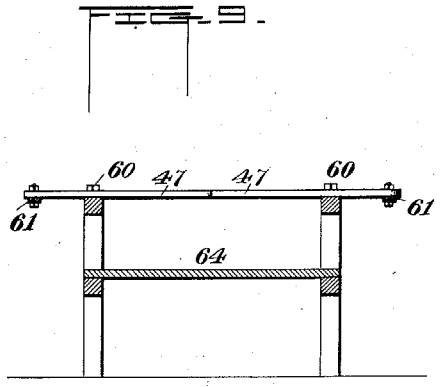
Figure 6:
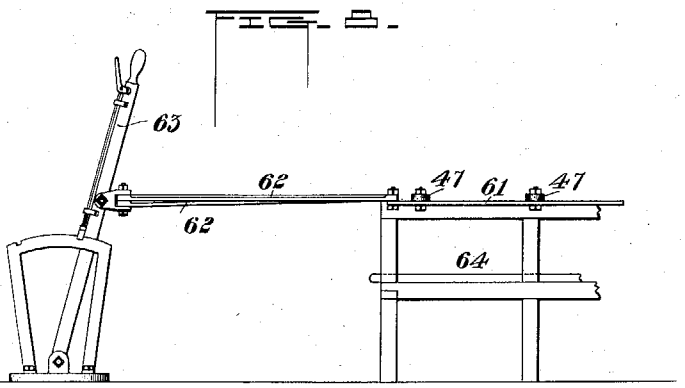

Figure 1 is a sectional plan view of the machine, the section being on the line *x x* of Fig. 3. Fig. 2 is a detail side view of the rollers 7 and 8, shown in Fig. 3. Fig. 3 is a vertical longitudinal section on the line *y y* of Fig. 1. Fig. 4 is a side elevation of part of the machine included between the line *z z* and the line *z′ z′* of Fig. 3. Fig. 5 is an end view of part of the machine, being an irregular section on the line *w w* of Fig. 4. Fig. 6 is a vertical longitudinal section of the traction and sanding apparatus shown in connection with the delivery end of the machine. Fig. 7 is a plan view of the table which receives the finished sheets. Fig. 8 is a partial side view of Fig. 7. Fig. 9 is a vertical cross-section on the line *v v* of Fig. 7.

Like symbols of reference indicate like parts in each.

In the drawings, Figs. 1 and 3, 2 represents the roll from which the primary sheet or web of paper is drawn. It is journaled near to a tank 4, which contains the melted asphaltum with which the paper is coated, and which is kept in a fluid condition by a fire in a furnace 5 underneath it. Within this tank are journaled two adjacent rollers 7, which are situate so that the lower parts of their circumference shall be continually immersed in the liquid. Above the rollers 7 are three smaller rollers 8, of which one is journaled between the rollers 7 and the other two are journaled at the sides thereof. This arrangement of the rollers keeps the paper in very close contact with the coating-rollers 7. All of the rollers 8 are in contact with or nearly in contact with the rollers 7. The manner in which these rollers are journaled is shown in Fig. 2. The upper rollers 8 are journaled in a frame 10, which is hinged at 11 to a frame 12, in which the lower rollers are journaled. The frame 10 can thus be lifted, as shown in Fig. 2, to separate the smaller rollers from the larger, the purpose of this arrangement being to facilitate the adjustment of the roofing-paper.

9 is a fixed bar at the forward edge of the tank 4, over which the paper passes as it leaves the tank. In advance of the tank 4 are two compression-rollers 14, which are journaled quite closely together in suitable bearings on the frame of the machine.

15 is the roll from which the second web of paper is drawn. It is journaled just back of the rollers 14 in peculiar bearings, hereinafter to be described. In advance of the rollers 14 is another compression device, which is a frame consisting of two bars 16, preferably hollow pipes, which are connected at one end by a branch pipe 18. This frame is longitudinally pivoted on trunnions 17, which are journaled in suitable bearings on the frame of the machine. The final compressing device consists of two cylinders 19, which are set forward of the frame 16, and are somewhat separated. A hollow weight or presser 20 rests upon the surface of the pipes 19 and bridges the space between them, extending nearly from end to end of the pipes. This weight is provided with projecting arms 21, pivoted to bars 22, which are parts of the machine-frame. A rope 23 is attached to the presser 20, and extends over a sheave 24ª to a convenient place. This constitutes the means whereby the presser may be lifted on the pivot of the arm 21 when desired.

We shall now describe the operation of these parts. The paper from the roll 2 is drawn down under the rolls 8 and over the rolls 7, as shown in Fig. 3, the frame 10 being first raised to permit the adjustment of the paper over the rolls 7, and then folded down on it into the position shown by full lines in Figs. 2 and 3. Then as the paper is drawn forward out of the tank its friction causes the rotation of the rolls 7 within the tank, and by pressure of the rollers 8, which keeps the paper in contact with these rollers 7, the under side of the paper is coated with a film of asphaltum. In order that the edges of the paper may not be sticky with exuding of the asphalt, we do not coat it throughout its whole width, but leave a small marginal strip on each side uncoated. Then when the coated paper is afterward compressed together with another strip of paper the asphaltum in the middle spreads out to the edges, and so gums both sheets together, but does not exude at the edges. We accomplish this partial coating of the sheet by making the lower rollers 7 shorter than the width of the paper, so that they shall not extend entirely across the same. After the paper which has been coated on its under side leaves the tank 4, it passes between the rollers 14, where it meets with the web of paper drawn from the roll 15. The compression of these rollers fixes the webs together. From the rollers 14 the united webs pass to the frame 16. It is arranged over the first of the pipes 16 and under the second, as shown in Fig. 3, and thence it passes over the cylinders 19, against which it is held by compression of the weight 20, which rests upon it. From the cylinders 19 the paper is drawn onto the receiving-table by mechanism hereinafter to be described. The effect of the rollers 14, the frame 16, and the cylinders 19 and weight 20 is to compress the paper very closely together. The frame 16 acts by tensioning the paper, the tension being caused by the difference in level of the pipes. The tension may be increased by turning the frame on its axis 17 in the direction of the arrow *b*, thus increasing the difference in level, and it may be diminished by turning the frame in the other direction, so as to bring the top of the rear pipe and the bottom of the forward pipe more nearly on the same plane. These motions of the frame may be imparted by hand; but we prefer to turn it, as shown in Fig. 4, by a lever 24, affixed to the axis 17, and provided with a rack or quadrant 25, by which the lever may be locked. The cylinders 19 are preferably hollow, and are connected at the ends by a pipe 34ª, and steam is circulated through both the cylinders 19 and frame 16, as illustrated in Fig. 1. The purpose of this is to keep the frame and cylinders hot, and so preserve the viscidity of the layer of asphaltum between the paper. The compression of the paper is in this way better effected and a securer union of the sheets is had. The action of the cylinder 19 and presser 20 is such that creases are taken out of the paper and it is smoothed or "ironed" into shape. This result is accomplished by reason of the fact that in passing over the cylinders, there is a frictional or rubbing action or compression exerted on the paper quite unlike the action of rollers revolving at the same surface speed as the paper, since while such rollers may exert a compressing action on the sheet, they lack that peculiar rubbing or ironing which is so efficient in finishing the sheet. In this regard the actions of the parts 16 and 19 are substantially the same—one serving to complete the work of the other.

It is desirable that the relative positions of the rolls of paper 2 and 15 should be such that the sheets shall fit evenly to each other and shall not overlap. To this end we make the roll 15 adjustable endwise, preferably in the manner shown on the third sheet of the drawings. The axis 26 of the roll 15 is journaled in a U-shaped frame or yoke 27, fixed to a cross-bar 28, which passes loosely through uprights 29 of the machine-frame.

30 is a connecting-rod which is attached to the upper part of the frame 27 and to a lever 31, which is suitably fulcrumed at a point 32. By depressing this lever the paper roll may be raised from the position shown in Fig. 4, which it occupies when the roll is set in place, into the elevated position shown in Fig. 3, which is its position during the operation of the machine.

At the end of the bar 28 there is a set-screw 33, provided with collars 34, between which is a forked end of the bar. The screw passes through a threaded socket in the frame 29. By turning this set-screw the bar 28 and the frame 27 may be shifted endwise in either direction, so as to adjust the paper, and so secure proper alignment of the roll 15 with the roll 2.

We have now described the operation of the machine in the manufacture of two-ply paper. In making three-ply paper it is somewhat different. It is then necessary to coat the primary web of paper on both sides, and instead, therefore, of passing the paper over the rollers 8 we carry it underneath these rollers through the liquid in the tank 4, as shown in Fig. 3. Each side of the paper is thus coated. To one side of it is united the paper from the roller 15, and for the other side we use a third roll of paper 35, which is arranged back and above the level of the rollers 14, and is mounted in a movable frame 36, similar to the frame 27, and made so for the purpose of shifting the roll 35 into alignment with the other two rolls 2 and 15. Since in making three-ply paper the primary web is immersed in the fluid in the tank 4, we are not able to prevent exuding of the asphaltum at the edge of the paper during compression. We, however, obviate the disadvantages of this exuding by an arrangement of mechanism shown in Figs. 1, 4, and 6. In advance of the cylinders 19 are two pipes 37, which lead from an elevated sand-hopper 38 and have their discharge ends just above the paper and at the edges thereof. When the paper is passing through the machine, the sand is allowed to flow through the pipes 37. In this way the exuded asphaltum at the margins of the paper is coated with sand, and the paper is thus deprived of its liability to stick to other sheets of finished roofing which may be superposed on it.

We shall now describe that part of the machine shown on Sheets 4 and 5, which comprises the mechanism which draws the paper through the machine and the mechanism which coats it with sand or gravel.

When it is desired to coat the outside of the roofing-sheet with a layer of sand or gravel, the sheet as it emerges from the cylinders 19 and presser 20 passes around rollers 40 and 41 and over rollers 42, which are arranged in a tank 43 similarly to the arrangement of the rollers 7 in the tank 4. (Shown in Fig. 3.) Rollers 44 press on the paper above the rollers 42 in like manner with the rollers 8 in Fig. 3. The tank 43 contains asphaltum or other similar substance to impart an adhesive coating to one side of the paper as it passes between the rollers 42 and 44. From the tank 43 the paper passes around a roller 45, at the front end of the receiving-table 46. The top of this table is constituted by a series of cross slats or bars 47, adapted to receive the roofing. The end of the paper is grasped by gripping-tongs 49, to which is attached a rope 50. The rope extends to the front of the table 46, and, passing around a pulley 51, there situated, extends back to the rear end of the table to a power-driven drum 52, to which it is fastened. Now, if the drum 52 be started it will draw the rope 50 in the direction of the arrow, pulling the roofing-sheet with it from the machine over the table 46. The roller 45 and, preferably, the rollers 40 and 41 are driven by suitable power-connections, so as to draw the roofing through the machine. As the roofing passes over the table 46, it is sanded by means of a hopper 53, which is filled with sand and has a discharge spout or nozzle directly over the table. This spout is controlled by a suitable valve 54. When the tongs 49 reach the forward end of the table, they are disengaged from the sheet, and the latter is suffered to drop upon the table and is cut off from the main web at a place back of the hopper 53. The tongs must then be drawn back to get a new grip upon the sheet. This is done by means of a rope 55, connected with a power-driven drum 56, and attached to a traveler 57, mounted on a track 59, and having a rope 58, which supports the tongs 49. On starting the drum 56 the traveler and tongs are drawn back to their original positions at the rear of the table 46. Before drawing the roofing again over the table 46 it is necessary first to remove the sheet which was before cut off, because the rubbing of the upper sheet over the sanded surface of the lower would displace and spoil the sand.

On Sheet 5 of the drawings we show a convenient means for removing the roofing from the surface of the table. The slats 47 are pivoted to the side rails of the table at points 60, and are divided at the middle. They also project beyond the outer sides of these rails. The outer projecting ends of the slats are connected by bars 61, which are themselves connected by links 62 to a hand-lever 63, Fig. 8. By drawing this lever into the position shown by dotted lines in Fig. 7 the slats 47 will be thrown back, as shown by dotted lines, and the sheet of roofing will be dropped from the slats upon a table 64, which is arranged underneath the table 46 and in the same frame-work. The lever can then be moved back to restore the slats to their original positions.

When it is not desired to coat the roofing with sand or gravel, the roofing is drawn directly from the cylinders 19 onto the table, as shown by dotted lines *c* in Fig. 6.

We claim—

1. In a roofing-machine, the combination of the tank 4, parallel rollers 7, arranged therein and immersed in the liquid thereof, and the rollers 8, arranged above the rollers 7, one of said rollers 8 being between the rollers 7 and the others at the outer sides thereof, substantially as and for the purposes described.

2. In a roofing-machine, the combination of the tank 4, rollers 7, arranged therein and immersed in the liquid of the tank, rollers 8, arranged above the rollers 7, and a hinged frame 10, within which the rollers 8 are mounted, substantially as and for the purposes described.

3. An improvement in the art of making roofing-paper, which consists in passing a web of paper in contact with a spreading-roller of less width than the paper, whereby the paper is coated with adhesive material and the margins are not coated, and then compressing said paper in contact with a second web of paper, whereby the adhesive material is caused to spread out to the edges of the two webs, substantially as and for the purposes described.

4. In a paper-roofing machine, the compression device consisting in a longitudinally-pivoted frame having side bars 16, substantially as and for the purposes described.

5. In a paper-roofing machine, the compression device consisting in a longitudinally-pivoted frame having hollow side bars 16, provided with steam-connections, substantially as and for the purposes described.

6. In a paper-roofing machine, the compression device consisting in a longitudinally-pivoted frame having side bars 16, in combination with a lever fixed to the axis of the frame and a rack, substantially as and for the purposes described.

7. The combination of the horizontal compression-cylinders 19 and a weight 20, resting thereupon, substantially as and for the purposes described.

8. In a roofing-machine, the sand-pipes 37, whose discharge ends are arranged over the roofing-sheet at the margins thereof, substantially as and for the purposes described.

9. In a roofing-machine, a paper-roll mounted in a tilting frame, in combination with adjusting mechanism for shifting the frame endwise, substantially as and for the purposes described.

10. In a roofing-machine, a primary receiving-table 46, situate at the delivery end of the machine, and a second table situate below the table 46, said table 46 having a bottom which is removable from under the roofing-sheets, whereby the latter are dropped upon the table below, substantially as and for the purposes described.

11. In a roofing-machine, a receiving-table consisting of partible pivoted slats 47, and bars 61, connecting said slats, substantially as and for the purposes described.

12. In a roofing-machine, the combination of a table situate at the delivery end thereof, gripping-tongs arranged to grasp the paper, a traveler supporting the tongs, a drum connected with the tongs for drawing it over the table, and a second drum 56, connected with the tongs for retracting them, substantially as and for the purposes described.

13. In a roofing-machine, the combination, with the web-coating mechanism, of a compression device consisting of bars 16, over and under which the web passes, substantially as and for the purposes described.

14. In a roofing-machine, the combination, with the web-coating mechanism, of a compression device consisting of bars 16, over and under which the web passes, said bars being hollow and provided with connections for the circulation of a heating medium, substantially as and for the purposes described.

15. In a roofing-machine, the combination, with the web-coating mechanism, of a compression device situate in the path of the web and constructed to exert a rubbing and compressing action thereon and to smooth or iron the layers thereof, substantially as and for the purposes described.

In witness whereof we have hereunto set our hands this 3d day of May, A. D. 1889.

JOHN A. McGRAW,
HENRY L. McGRAW,
GEORGE W. McGRAW, Jr.,
CHARLES EDWIN McGRAW,
*Assignees of George W. McGraw, deceased.*

In presence of—
W. B. Corwin,
Jno. K. Smith.